(12) United States Patent
Chien et al.

(10) Patent No.: US 8,165,902 B2
(45) Date of Patent: Apr. 24, 2012

(54) METHOD AND INSURANCE PLATFORM FOR INVESTMENT-TYPE WHOLE LIFE INSURANCE AT AUTONOMOUS INTEREST RATES

(75) Inventors: Yung-Sung Chien, Taipei (TW); Kuen-Bao Ling, Taipei (TW)

(73) Assignee: Shacom.com Inc., Taipei (TW)

( * ) Notice: Subject to any disclaimer, the term of this patent is extended or adjusted under 35 U.S.C. 154(b) by 838 days.

(21) Appl. No.: 12/238,485

(22) Filed: Sep. 26, 2008

(65) Prior Publication Data
US 2009/0089103 A1 Apr. 2, 2009

(30) Foreign Application Priority Data

Sep. 29, 2007 (TW) .............................. 96136637 A
Sep. 4, 2008 (TW) .............................. 97133909 A

(51) Int. Cl.
*G06Q 40/00* (2012.01)
(52) U.S. Cl. ......................................................... 705/4
(58) Field of Classification Search ....................... 705/4
See application file for complete search history.

(56) References Cited

U.S. PATENT DOCUMENTS

| | | | |
|---|---|---|---|
| 6,456,979 B1 * | 9/2002 | Flagg | 705/4 |
| 2009/0063199 A1 * | 3/2009 | Chien et al. | 705/4 |
| 2009/0281840 A1 * | 11/2009 | Hersch | 705/4 |
| 2010/0063853 A1 * | 3/2010 | Foti et al. | 705/4 |
| 2010/0169128 A1 * | 7/2010 | Berlin et al. | 705/4 |

\* cited by examiner

*Primary Examiner* — Jessica Lemieux
(74) *Attorney, Agent, or Firm* — Ming Chow; Sinorica, LLC

(57) ABSTRACT

A method and insurance platform for whole life insurance implemented in the insurance field of financial e-commerce is provided. The present invention reflects the interactivity between a consumer and a platform provider in the age of network technology, and creates an insurance platform to enable the consumer to expand his/her credit on the platform and increase investment opportunities according to his/her own risk preference.

The present invention provides the insurance platform to replace the savings block of the whole life insurance, such that information symmetry is created between an insurance company and the consumer and the closure of the conventional insurance product is broken to enable the insurance products to compete on the active market of financial products.

22 Claims, 3 Drawing Sheets

METHOD AND INSURANCE PLATFORM FOR INVESTMENT-TYPE WHOLE LIFE INSURANCE AT AUTONOMOUS INTEREST RATES

BACKGROUND OF THE INVENTION

1. Field of Invention

The present invention relates to the field of life insurance, and more particularly to a method and insurance platform for whole life insurance combined with an investment at autonomous interest rates created by using the information technology.

2. Related Art

The whole life insurance can be regarded as a death insurance, i.e., a permanent death insurance of an insurant. In other words, the whole life insurance is a term death insurance, in which the insurance period does not expire until the insurant dies. Therefore, the whole life insurance is comparatively applicable to insurants having heavy family responsibilities and groups reserving retirement pensions.

However, the guarantee value of the whole life insurance is higher than the cash value only in the first few years of the initial insurance. That is, if no accident happens to the customer in the insurance period, the savings benefit is very low. Moreover, the information about the investment of the insurance company is not open, so the insured can neither know the profit nor decide the profit. Such an insurance product structure is very unfair to consumers. The insurance company makes large profit based on information asymmetry even to the extent of making a fortune out of the ignorance of the consumers.

Generally speaking, for the insurance company, the whole life insurance enables the insurance company to earn a great benefit from the funds operation under interest rate spread risks; for the customers, the whole life insurance completely lacks the benefit of savings. Therefore, it has become an urgent task for the insurance industry to solve to reflect the characteristics of information efficiency of the network technology, to establish an insurance platform, and to increase the customer's benefit of savings.

In recent years, with the development of the network technology, the information largely inclines towards consumers. The conventional whole life insurance product cannot satisfy the consumers any more. The consumers hope to have some room for autonomy on the insurance platform. Therefore, how to inject the concept of autonomy for consumers into the insurance platform is a main condition for the insurance industry to win today.

Particularly, in the age of the network economy, investment products are diversified, and time deposits of the entire banking industry largely flow towards various financial products such as stocks, funds, and bonds. As known from the variation of American IRA investment objective distribution proportion, the bank deposit accounts for 42% of the investment objective distribution proportion in 1990, which is reduced to 9% in ten years in 2000. On the life insurance market, according to the experience of other industrial countries, in people's financing funds, 25% is savings, 25% is invested on the common fund, and remaining less than 10% of the funds goes to the life insurance market. Therefore, how can the life insurance products strengthen the multi-function of the savings becomes the key for the life insurance industry to compete and win on the financial market.

U.S. Pat. Gazette No. 6,456,979, entitled "Method of Evaluating a Permanent Life Insurance Policy", proposes to establish a basic insurance cost architecture and then adjust a premium of an individual insured according to various factors such as the gender and life form of the insured. US Patent Publication No. US2007005399, entitled "Method and Computer Program for Evaluating the Sustainability of a Permanent Life Insurance Policy" asks a proposer various questions through a system to assist the proposer in selecting the most appropriate insurance product. However, the two patents do not solve the problem that the whole life insurance product lacks the savings benefit.

Japanese Patent Publication No. JP2004062632, entitled "System, Method and Program for Processing Whole-life Insurance Change" and Japanese Patent Publication No. JP2003281372, entitled "Processing System for Shifting Insurance Contract to Whole-life Insurance, Insurance Contract Processing System, Processing Method for Shifting Insurance Contract to Whole-life Insurance, and Its Program" propose a system that enables an insured to shift an insurance contract to a whole life insurance policy and calculates relevant funds demands of the policy. However, they do not solve the fundamental problem that the whole life insurance lacks the savings benefit. The conventional whole life insurance product is a product of the age of the industrial economy, which lacks the information symmetry and has no room for autonomy of the consumers. Therefore, a financial insurance product reflecting the age of the network technology is expected not only by the insurance industry but also by the mass consumers.

SUMMARY OF THE INVENTION

In order to solve the fundamental problem that the whole life insurance information is asymmetrical, provide a proposer with opportunities of expanding his/her credit with various risk preferences, and make the whole life insurance more suitable for the active financial market, the present invention is directed to a method and system for investment-type whole life insurance at autonomous interest rates. The objectives of the present invention are as follows.

1. In the present invention, a deposit and borrowing insurance platform at autonomous interest rates is constructed, such that a competitive bidding savings mechanism replaces savings of the conventional whole life insurance, and static savings are converted into dynamic savings. Thus, an insurance company can earn a commission fee and avoid interest rate spread risks.

2. The insurance platform created in the present invention enables an insurance customer to have opportunities of raising funds, expanding his/her credit, and participating in an investment, and thus attracts investor groups with various different preferences.

3. The insurance platform created in the present invention reflects the interactivity of information in the age of the network technology, and turns the insurance into a fairer and more reasonable financial product.

4. The present invention is an open insurance product, which is different from the conventional insurance product that is suitable for only specific investor groups, and can meet the demands of investor groups with various risk preferences on the market.

5. The present invention reflects the market interest rate through the operation of the deposit and borrowing insurance platform at autonomous interest rates, and thus is a competitive financial product on the market.

In a method for investment-type whole life insurance at autonomous interest rates of the present invention, an insurance company fulfills a whole life insurance policy which provides a channel for savings and investment in addition to an insurance money; a proposer may join a deposit and borrowing platform at autonomous interest rates operated by a financial institution to perform the savings, so as to obtain a steady savings return at a high interest rate; if the proposer seeks other investment manners, he/she may also compete for a bid and submit a successful bidding amount to the financial institution for investment management. Under this architecture, the proposer not only has two options of savings and investment, but also can obtain a higher return, such that a beneficiary obtains a higher guarantee when an accident happens.

In order to achieve the above objectives, the present invention provides a method for investment-type whole life insurance at autonomous interest rates, which combines a whole life insurance with a deposit and borrowing mode at autonomous interest rates of an insurance platform to set up an investment-type whole life insurance contract at autonomous interest rates. The method includes the following steps.

A proposer applies for an investment-type whole life insurance at autonomous interest rates to the insurance platform, and an online policy processing and issuing module of the insurance platform instructs the proposer to fill basic information.

The online policy processing and issuing module audits the basic information filled by the proposer, and analyzes a policy condition of the investment-type whole life insurance at autonomous interest rates and provides an insurance scale combination of the investment-type whole life insurance at autonomous interest rates for the proposer to select according to the basic information of the proposer.

When the proposer accepts the proposed condition and completes selecting the insurance scale combination, the online policy processing and issuing module approves the whole life insurance applied by the proposer, and collects a premium from the proposer and issues a policy to the proposer.

The proposer logs in to the insurance platform to participate in a competitive bidding.

The proposer enters a bidding amount into the insurance platform. A deposit and borrowing competitive bidding module at autonomous interest rates of the insurance platform calculates an average deposit interest rate and a borrowing interest rate of the bidding proposer according to the entered bidding amount, and determines a successful bidding amount and a number of successful bidders according to a fund balance of the insurance platform and the borrowing interest rate of the bidding proposer.

The deposit and borrowing competitive bidding module at autonomous interest rates clears a total successful bidding amount of the successful bidding proposer according to the successful bidding amount, and clears a deposit amount of the unsuccessful bidding proposer according to the average borrowing interest rate and a deposit bid bond of the successful bidding proposer, a highest bidding amount of the unsuccessful bidding proposer, or a benchmark interest rate.

The deposit and borrowing competitive bidding module at autonomous interest rates settles and deposits the total successful bidding amount in an investment sub-account of the successful bidding proposer, and settles and deposits the deposit amount in a savings sub-account of the unsuccessful bidding proposer.

An accident identification and fund appropriation module of the insurance platform determines whether an accident happens to an insurant before or after a whole life insurance payment period expires, so as to appropriate insurance proceeds and a balance of the investment sub-account or the savings sub-account to a beneficiary or appropriate the balance of the investment sub-account or the savings sub-account to the proposer.

The present invention constructs an insurance platform for investment-type whole life insurance at autonomous interest rates, to which a proposer may be connected through a user terminal. The insurance platform includes an online policy processing and issuing module, a deposit and borrowing competitive bidding module at autonomous interest rates, and an accident identification and fund appropriation module.

The online policy processing and issuing module is used for accepting an application of the proposer for an investment-type whole life insurance at autonomous interest rates, receiving and auditing basic information filled by the proposer through the user terminal, analyzing a policy condition of the investment-type whole life insurance at autonomous interest rates and providing an insurance scale combination of the investment-type whole life insurance at autonomous interest rates for the proposer to select according to the basic information of the proposer, and collecting a premium from the proposer and issuing a policy to the proposer when approving the investment-type whole life insurance at autonomous interest rates applied by the proposer.

The deposit and borrowing competitive bidding module at autonomous interest rates is used for the proposer to enter a bidding amount through the user terminal to calculate an average deposit interest rate and a borrowing interest rate, determining a successful bidding amount and a number of successful bidders according to a fund balance of the deposit and borrowing competitive bidding module at autonomous interest rates and the borrowing interest rate, clearing a total successful bidding amount according to the successful bidding amount, clearing a deposit amount according to the average borrowing interest rate and a deposit bid bond, a highest bidding amount, or a benchmark interest rate, settling and depositing the total successful bidding amount in an investment sub-account, and settling and depositing the deposit amount in a savings sub-account.

The accident identification and fund appropriation module is used for determining whether an accident happens to an insurant before or after a whole life insurance payment period expires, so as to appropriate insurance proceeds and a balance of the investment sub-account or the savings sub-account to a beneficiary or appropriate the balance of the investment sub-account or the savings sub-account to the proposer.

DETAILED DESCRIPTION OF THE INVENTION

The present invention creates a funds competitive bidding platform based on the law of large numbers by using a deposit and borrowing platform at autonomous interest rates in ROC patent application No. 096116081, entitled "Method and System for Constructing Online Deposit and Borrowing Platform at Autonomous Interest Rates". Thus, a client participating in the platform may raise funds to expand his/her credit and increase an investment through a funds competitive bidding mechanism of the platform according to his/her own investment decision, or adopt a conservative strategy to not participate in a competitive bidding to earn merely an interest, and a financial institution can earn a commission fee as a platform service provider.

The insurance platform created in the present invention provides an opportunity for an interaction between an insurance company and a consumer, and enables a single insurance product to meet the demands of groups with various risk preferences under the funds competitive bidding and flow mechanism of the platform.

In order to make the present invention practicable, preferred embodiments will be described in detail below.

Figure 1:
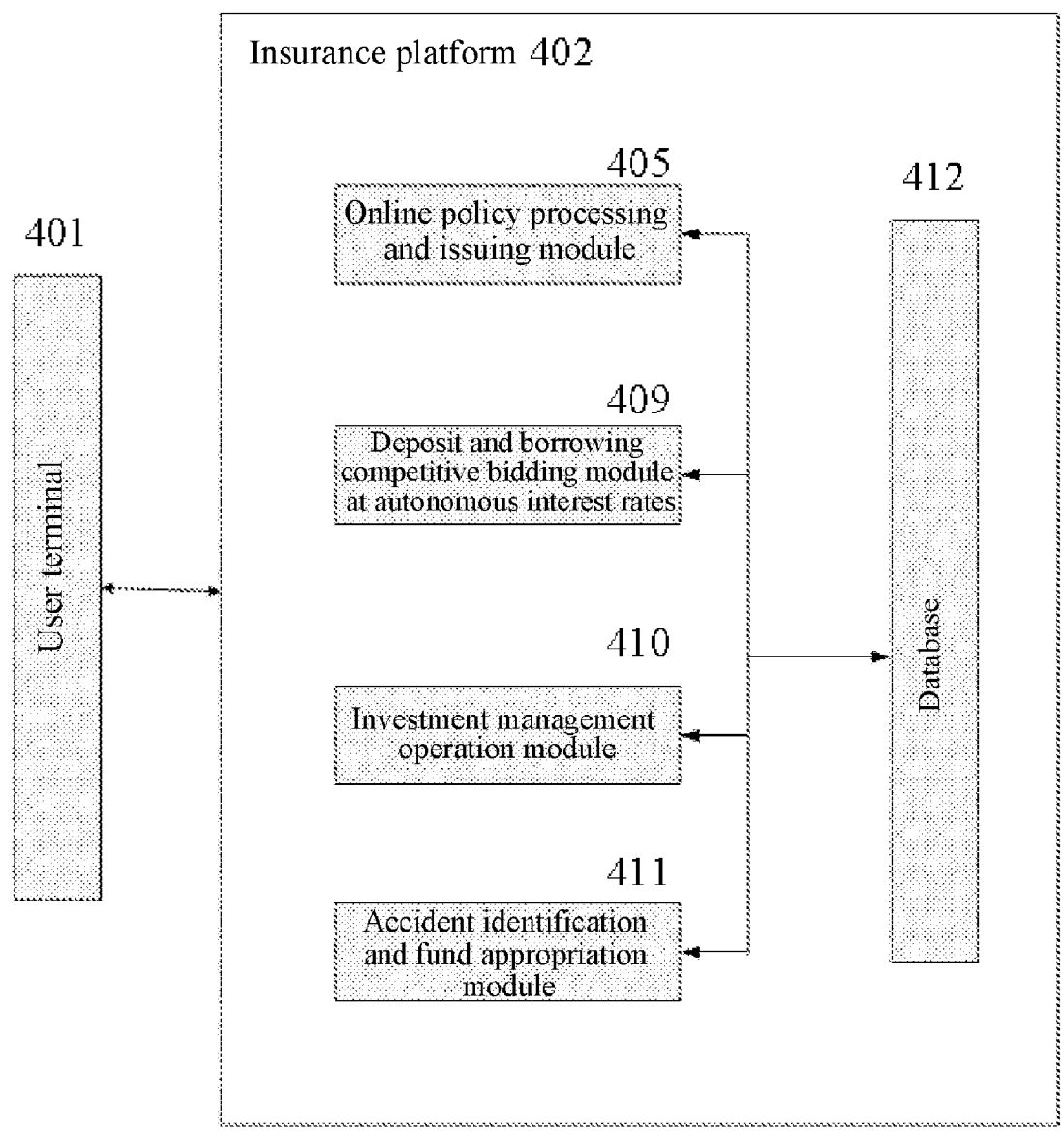
FIG. 1 is a block diagram of an insurance platform for investment-type whole life insurance at autonomous interest rates of the present invention.

FIG. 1 is a block diagram of an insurance platform for investment-type whole life insurance at autonomous interest rates of the present invention. In FIG. 1, the insurance platform 402 includes an online policy processing and issuing module 405, a deposit and borrowing competitive bidding module 409 at autonomous interest rates, an investment management operation module 410, an accident identification and fund appropriation module 411, and a database 412. A user terminal 401 is externally connected to the insurance platform 402.

The online policy processing and issuing module 405 is used for accepting an application of a proposer for an investment-type whole life insurance at autonomous interest rates, and receiving and auditing basic information filled by the proposer through the user terminal 401. The online policy processing and issuing module 405 analyzes a policy condition of the investment-type whole life insurance at autonomous interest rates and provides an insurance scale combination of the investment-type whole life insurance at autonomous interest rates for the proposer to select according to the basic information of the proposer. When approving the investment-type whole life insurance at autonomous interest rates applied by the proposer, the online policy processing and issuing module 405 collects a premium from the proposer and issues a policy to the proposer.

The online policy processing and issuing module 405 analyzes the policy condition to generate a total payment amount, insurance proceeds, a policy type, and other conditions and contents of an insurance contract covered by the proposer. The step of providing the insurance scale combination of the investment-type whole life insurance at autonomous interest rates by the online policy processing and issuing module 405 includes analyzing a total payment amount of the policy according to an employment status and a financial status in the basic information of the proposer and generating at least one insurance scale combination for the proposer to select. The insurance scale combination includes a payment period, a number of competitive bidding sessions, a competitive bidding contribution amount, and the premium to be paid in each of the sessions. The online policy processing and issuing module 405 stores the policy condition and the insurance scale combination in the database 412.

The online policy processing and issuing module 405 issues the policy as well as an account and a password to the proposer. The proposer may enter the account and password through the user terminal 401 to log in to the insurance platform 402 so as to participate in a competitive bidding. The online policy processing and issuing module 405 stores the policy as well as the account and password in the database 412.

The basic information filled by the proposer through the user terminal 401 is a physical status, health, medical record information, and life and work attributes of an insurant, employment statuses, income levels, financial statuses of the proposer and the insurant, and relevant information for determining an underwriting condition of the proposer and a risk degree of the insurant. The online policy processing and issuing module 405 stores the information in the database 412.

The deposit and borrowing competitive bidding module 409 at autonomous interest rates is used for the proposer to enter a bidding amount through the user terminal to calculate an average deposit interest rate and a borrowing interest rate. The deposit and borrowing competitive bidding module 409 at autonomous interest rates determines a successful bidding amount and a number of successful bidders according to a fund balance of the deposit and borrowing competitive bidding module 409 at autonomous interest rates and the borrowing interest rate, clears a total successful bidding amount according to the successful bidding amount, and clears a deposit amount according to the average borrowing interest rate and a deposit bid bond, a highest bidding amount, or a benchmark interest rate. The deposit and borrowing competitive bidding module 409 at autonomous interest rates settles and deposits the total successful bidding amount in an investment sub-account, and settles and deposits the deposit amount in a savings sub-account.

The investment management operation module 410 is used for publishing, through the user terminal 401, an investment objective, an investment profit and loss, and a net asset value of an investment of the invested and managed funds of the investment sub-account, and storing the information in the database 412.

The accident identification and fund appropriation module 411 is used for determining whether an accident happens to the insurant before or after a whole life insurance payment period expires, so as to appropriate insurance proceeds and a balance of the investment sub-account or the savings sub-account to a beneficiary or appropriate the balance of the investment sub-account or the savings sub-account to the proposer.

The database 412 is used for the online policy processing and issuing module 405 to access the basic information of the proposer, the policy condition, the insurance scale combination, and other information, for the deposit and borrowing competitive bidding module 409 at autonomous interest rates to access the bidding amount, the average deposit interest rate, the borrowing interest rate, the fund balance, the successful bidding amount and the number of the successful bidders, the deposit bid bond, the highest bidding amount, the deposit amount, the total successful bidding amount, the investment sub-account, the savings sub-account, and other information, and for the accident identification and fund appropriation module 411 to access the accident identification, the fund appropriation, and other information.

A deposit and borrowing method at autonomous interest rates with the characteristic of direct finance is mainly constructed on the basis of a concept of fund balance. The deposit and borrowing competitive bidding module 409 at autonomous interest rates of the insurance platform 402 calculates corresponding borrowing interest rates according to bidding amounts of all bidders (i.e., proposers), and determines the number of bidders who win the bid, the total successful bidding amount that all successful bidders (also the proposers) can obtain, and the amount that unsuccessful bidders (depositors, also the proposers) should deposit at each time point (i.e., a bid opening time) according to the fund balance and the borrowing interest rates. The process is as follows:

Step 1: let the number of successful bidders be zero, and the deposit and borrowing competitive bidding module 409 at autonomous interest rates calculates a fund balance at this time point. The deposit and borrowing competitive bidding module 409 at autonomous interest rates calculates the fund balance by subtracting the total successful bidding amount of all successful bidders at this time point from the amount that all unsuccessful bidders should deposit at this time point. Only a total deposit amount of all depositors and the amount required to be deposited by the unsuccessful bidders need to be calculated in this step. The calculation is performed with the following two formulas based on whether the interest is pre-paid or post-paid:

In the case of pre-paid interest:

$$U\text{-}IX_n \tag{1}$$

In the case of post-paid interest:

$$U \tag{2}$$

where,

U is a competitive bidding upper limit of the bidder; and $IX_n$ is a deposit bid bond of the depositor calculated according to a benchmark interest rate in the $n^{th}$ session.

In addition, the total successful bidding amount of the successful bidders (the borrowers) is calculated with the following two formulas based on whether the interest is pre-paid or post-paid:

$$\text{In the case of pre-paid interest:} \tag{3}$$
$$A_n = (U - I_n) \times (N - n) + U \times (n - 1)$$

$$\text{In the case of post-paid interest:} \tag{4}$$
$$A_n = U \times (N - n) + U \times (n - 1) + \sum_{i=1}^{n-1} I_i$$

where, $A_n$ is the total successful bidding amount of the successful bidders when the bid is won in the $n^{th}$ session;

U is a competitive bidding upper limit;

N is a total contracted number of sessions;

n is a current session, and $n \leq N$ $I_n$ is the successful bidding amount in the $n^{th}$ session of the successful bidder; and $I_i$ is the amount that the depositor deposits in the $i^{th}$ session, and i<n.

The pre-paid interest refers to that the interest to be paid in the future has been deducted from the obtained principal in advance at borrowing, which is similar to the zero coupon bond. The post-paid interest refers to that complete principal can be obtained at borrowing and the interest will be paid in the future when making repayments, which is similar to the common loan or house loan.

Step 2: the deposit and borrowing competitive bidding module 409 at autonomous interest rates determines whether a fund balance X at a previous time point+a fund balance $B_0$ at this time point (i.e., a fund level) is less than or equal to zero. If the fund balance X at the previous time point plus the fund balance $B_0$ at this time point is less than or equal to zero (i.e., $B_0+X \leq 0$), the deposit and borrowing competitive bidding module 409 at autonomous interest rates determines that nobody wins the bid at this time point, that is, all bidders have to deposit money at this time point. On the contrary, if the deposit and borrowing competitive bidding module 409 at autonomous interest rates determines that the fund balance is greater than zero, the flow proceeds to Step 3.

When a deposit and borrowing mechanism at autonomous interest rates similar to the direct finance is constructed, the fund balance in the deposit and borrowing competitive bidding module 409 at autonomous interest rates should be equal to zero. However, the probability that the fund balance in the deposit and borrowing competitive bidding module 409 at autonomous interest rates is exactly equal to zero is very small. Therefore, the fund balance thereof is bound to be greater than or equal to or smaller than or equal to zero. If the fund balance in the deposit and borrowing competitive bidding module 409 at autonomous interest rates is greater than zero, for a financial institution operating this method, the form of the fund balance becomes a borrowing amount of the financial institution, resulting in an outlay cost of the financial institution. If the fund balance in the deposit and borrowing competitive bidding module 409 at autonomous interest rates is smaller than zero, for the financial institution operating this method, the form of the fund balance becomes a lending amount of the financial institution, and the financial institution can earn a small amount of commission fee, thereby changing the conventional operating mode of indirect finance in which the financial institution earns a spread between the deposit interest rate and the loan interest rate. Here, in the deposit and borrowing method at autonomous interest rates, it is assumed that the fund balance in the deposit and borrowing competitive bidding module 409 at autonomous interest rates is smaller than or equal to zero in the operation of the competitive bidding transaction.

Step 3: the borrowing interest rates are sorted. If the fund balance calculated by the deposit and borrowing competitive bidding module 409 at autonomous interest rates in Step 2 is greater than zero, the deposit and borrowing competitive bidding module 409 at autonomous interest rates calculates corresponding borrowing interest rates for the bidding amounts of bidders who place bids, and sorts the borrowing interest rates. When a borrowing interest rate of bid bond in the $n^{th}$ (n falls at this time point for calculation) session of a bidder is calculated, the deposit and borrowing competitive bidding module 409 at autonomous interest rates first uses the following formula (5) to calculate an average deposit interest rate r of previous sessions of the bidder, and then uses the following formula (6) to calculate a borrowing interest rate R if the bidder wins the bid at the time point, for example, by using a financial concept of internal rate of return (IRR). The formulas are as follows:

$$\sum_{i=1}^{n-1}(U - I_i) \times (1 + r)^{N-i} = U \times (n - 1) \tag{5}$$

$$\sum_{i=1}^{n-1}(U - I_i) \times (1 + r)^{n-i} + \sum_{j=1}^{N-n} U \times \left(\frac{1}{1+R}\right)^j = A_n \tag{6}$$

where,

U is a competitive bidding upper limit;

N is a total contracted number of sessions;

n is a current session, and $n \leq N$;

$I_i$ is the amount that the depositor deposits in the $i^{th}$ session, and i<n;

r is the average deposit interest rate from the $1^{st}$ to the $i^{th}$ session of the depositor;

R is the borrowing interest rate; and $A_n$ is the total successful bidding amount of the successful bidders if the bid is won in the $n^{th}$ session, and is calculated with reference to formulas (3) and (4).

The deposit and borrowing competitive bidding module 409 at autonomous interest rates sorts the borrowing interest rates corresponding to all bidders from high to low immediately after calculating the borrowing interest rates of all bidders at this time point.

Step 4: the deposit and borrowing competitive bidding module 409 at autonomous interest rates finds a maximum number of successful bidders making the fund balance smaller than or equal to zero. In this step, for example, a concept of trial and error method is used to find the number of the successful bidders n when the fund balance at this time point plus the fund balance at a previous time point of the deposit and borrowing competitive bidding module 409 at autonomous interest rates is smaller than or equal to zero, and then, a minimum number of bidders who win the bid is found:

Min $$\{n|B_n + X \leq 0\} \tag{7}$$

where, $B_n$ is the fund balance when the number of the successful bidders at this time point is n; and X is the fund balance at the previous time point.

Step 5: the successful bidders are cleared. For the successful bidders (borrowers), the deposit and borrowing competitive bidding module 409 at autonomous interest rates calculates the total successful bidding amount of the successful bidders in the situation that the bid is won at this time point. The calculation of the deposit and borrowing competitive bidding module 409 at autonomous interest rates is performed with the following two formulas based on whether the interest is pre-paid or post-paid:

In the case of pre-paid interest:

$$A_n = (U - I_n) \times (N - n) + U \times (n - 1) \tag{8}$$

In the case of post-paid interest:

$$A_n = U \times (N - n) + U \times (n - 1) + \sum_{i=j}^{n-j} I_i \tag{9}$$

where, $A_n$ is the total successful bidding amount of the successful bidders when the bid is won in the $n^{th}$ session;

U is a competitive bidding upper limit;

N is a total contracted number of sessions;

n is a current session, and $n \leq N$;

$I_n$ is the successful bidding amount in the $n^{th}$ session of the successful bidder; and $I_i$ is the amount that the depositor deposits in the $i^{th}$ session, and i<n.

The successful bidder needs to make repayments in the future sessions, and a repayment amount is calculated according to the following formulas:

In the case of pre-paid interest:

$$U \tag{10}$$

In the case of post-paid interest:

$$U + I_n \tag{11}$$

where,

U is a competitive bidding upper limit; and $I_n$ is the amount that the bidder bids in the $n^{th}$ session.

Step 6: the users who do not win the bid are cleared. When the deposit and borrowing competitive bidding module 409 at autonomous interest rates determines that the number of people that may win the bid at this time point is n (n=1 . . . i), the deposit and borrowing competitive bidding module 409 at autonomous interest rates calculates an average borrowing interest rate when the number of bidders who may win the bid at this time point is n, and then calculates a deposit amount $IA_n$ of an unsuccessful bidder (i.e., a depositor). The deposit and borrowing competitive bidding module 409 at autonomous interest rates clears the deposit amount $IA_n$ of the depositors with the following two formulas based on whether the interest is pre-paid or post-paid:

In the case of pre-paid interest:

$$(U - IA_n) \times (1 + R_a)^{N-n} = U \tag{12}$$

In the case of post-paid interest:

$$U \times (1 + R_a)^{N-n} = U + IA_n \tag{13}$$

where,

U is a competitive bidding upper limit;

N is a total contracted number of sessions;

n is a current session, and $n \leq N$;

$IA_n$ is the deposit amount of the depositor calculated according to the average borrowing interest rate of the $n^{th}$ session; and $R_a$ is an average borrowing interest rate.

If a bidder wins the bid at this time point, the deposit and borrowing competitive bidding module 409 at autonomous interest rates calculates the deposit amount $IA_n$ according to the average borrowing interest rate. The amount to be deposited by the unsuccessful bidder is similarly calculated with the following two formulas based on whether the interest is pre-paid or post-paid:

In the case of pre-paid interest:

$$U - IA_n \tag{14}$$

In the case of post-paid interest:

$$U \tag{15}$$

where,

U is a competitive bidding upper limit; and $IA_n$ is the deposit amount of the depositor calculated according to the average borrowing interest rate of the $n^{th}$ session.

If no bidder wins the bid, but the bidder places a bid at this time point (the bidder must deposit money because he/she does not win the bid), the management server of the fund transaction platform calculates the deposit amount of the bidder with the following two formulas based on whether the interest is pre-paid or post-paid:

In the case of pre-paid interest:

$$U - IH_n \tag{16}$$

In the case of post-paid interest:

$$U \tag{17}$$

where,

U is a competitive bidding upper limit; and $IH_n$ is a highest bidding amount of the bidder who does not win the bid in the $n^{th}$ session.

As for the unsuccessful bidder, if no bidder wins the bid and the bidder does not place any bid in the $n^{th}$ session, the deposit and borrowing competitive bidding module 409 at autonomous interest rates calculates the deposit amount of the bidder with the following two formulas based on whether the interest is pre-paid or post-paid:

In the case of pre-paid interest:

$$U - IX_n \tag{18}$$

In the case of post-paid interest:

$$U \tag{19}$$

where,

U is a competitive bidding upper limit; and $IX_n$ is the deposit amount of the depositor calculated according to a benchmark interest rate of the $n^{th}$ session.

Figure 2:
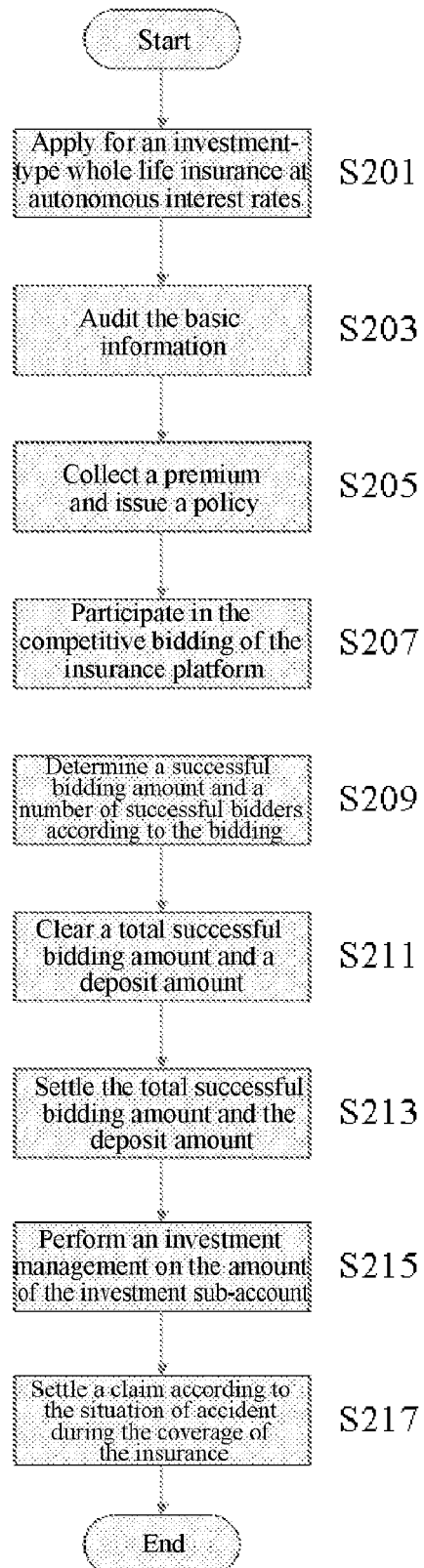
FIG. 2 is a flow chart of a method for investment-type whole life insurance at autonomous interest rates of the present invention.

FIG. 2 is a flow chart of a method for investment-type whole life insurance at autonomous interest rates of the present invention. The flow of FIG. 2 is described with reference to the components in FIG. 1. The method for investment-type whole life insurance at autonomous interest rates of the present invention combines a whole life insurance with a deposit and borrowing mode at autonomous interest rates of an insurance platform to set up an investment-type whole life insurance contract at autonomous interest rates. The investment-type whole life insurance contract at autonomous interest rates refers to that the proposer can log in to the insurance platform 402 through a user terminal 401 and select to participate in a competitive bidding in a payment period after he/she covers the insurance. The method includes the following steps.

First, a proposer applies for an investment-type whole life insurance at autonomous interest rates to the insurance platform 402 through the user terminal 401, and the online policy processing and issuing module 405 instructs the proposer to fill basic information through the user terminal 401 (Step S201). The basic information required to be filled is described as above. The online policy processing and issuing module 405 stores the information in the database 412.

Then, the online policy processing and issuing module 405 audits the basic information filled by the proposer, analyzes a policy condition of the investment-type whole life insurance at autonomous interest rates, and provides an insurance scale combination of the investment-type whole life insurance at autonomous interest rates for the proposer to select according to the basic information of the proposer (Step S203). The online policy processing and issuing module 405 stores the policy condition and the insurance scale combination in the database 412. The policy condition and the insurance scale combination are described as above.

A policy payment period is the same as a competitive bidding period of the insurance platform 402, in which the proposer can participate in the competitive bidding of the insurance platform 402 in the case that the proposer pays a premium in each session.

When the proposer accepts the proposed condition and completes selecting the insurance scale combination, the online policy processing and issuing module 405 approves the whole life insurance applied by the proposer, and collects a premium from the proposer and issues a policy to the proposer (Step S205). When approving the policy, the online policy processing and issuing module 405 gives the proposer an account and a password. The proposer may enter the account and password through the user terminal 401 to log in to the insurance platform 402 so as to participate in the competitive bidding. The online policy processing and issuing module 405 stores the account and the password in the database 412.

Next, the proposer enters the account and the password through the user terminal 401 to log in to the insurance platform 402 so as to participate in the competitive bidding (Step S207). Afterwards, the proposer enters a bidding amount into the insurance platform 402 through the user terminal 401. The deposit and borrowing competitive bidding module 409 at autonomous interest rates calculates an average deposit interest rate and a borrowing interest rate of the bidding proposer based on the description of Step 3 of the deposit and borrowing method at autonomous interest rates according to the entered bidding amount. In Steps 1-4 of the deposit and borrowing method at autonomous interest rates, the deposit and borrowing competitive bidding module 409 at autonomous interest rates determines a successful bidding amount and a number of successful bidders according to a fund balance thereof and the borrowing interest rate of the bidding proposer (Step S209).

In Step 5 of the deposit and borrowing method at autonomous interest rates, the deposit and borrowing competitive bidding module 409 at autonomous interest rates clears a total successful bidding amount of the successful bidding proposer according to the successful bidding amount. In Step 6 of the deposit and borrowing method at autonomous interest rates, the deposit and borrowing competitive bidding module 409 at autonomous interest rates clears a deposit amount of the unsuccessful bidding proposer according to the average borrowing interest rate and a deposit bid bond of the successful bidding proposer, a highest bidding amount of the unsuccessful bidding proposer, or a benchmark interest rate (Step S211).

Then, the deposit and borrowing competitive bidding module 409 at autonomous interest rates settles and deposits the total successful bidding amount in an investment sub-account of the successful bidding proposer, and settles and deposits the deposit amount in a savings sub-account of the unsuccessful bidding proposer (Step S213).

Before the proposer wins the bid, the deposit amount of the proposer is deposited in the savings sub-account and an interest of the deposit amount is calculated. After the proposer wins the bid, all funds are deposited in the investment sub-account and an investment management is performed until the policy payment period expires. If the proposer does not win the bid or does not participate in the competitive bidding when the policy payment period expires, all the deposit amount is deposited in the savings sub-account upon the expiration of the policy payment period.

Then, for example, an investment manager makes an investment on the funds in the investment sub-account of the successful bidding proposer and manages the investment, and the investment management operation module 410 publishes an investment objective, an investment profit and loss, and a net asset value corresponding to the investment of the funds of the investment sub-account to the proposer through the user terminal 401, and stores the information in the database 412 (Step S215). Afterwards, the accident identification and fund appropriation module 411 determines whether an accident happens to an insurant before or after a whole life insurance payment period expires, so as to appropriate insurance proceeds and a balance of the investment sub-account (when the proposer wins the bid) or the savings sub-account (when the proposer does not win the bid) to a beneficiary, or appropriate the balance of the investment sub-account or the savings sub-account to the proposer (Step S217).

Figure 3:
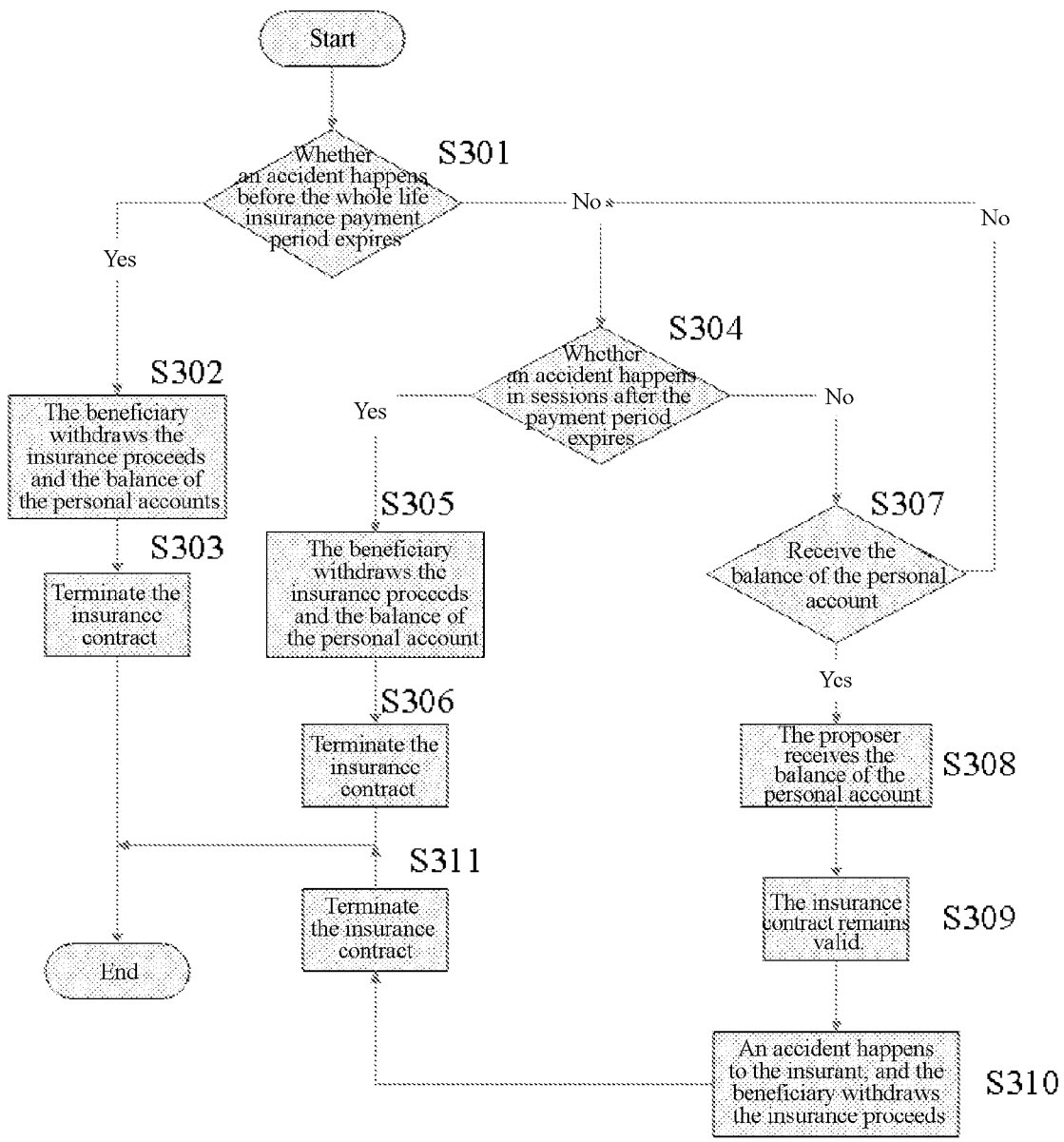
FIG. 3 is a flow chart of the process for appropriating the insurance money of an investment-type whole life insurance at autonomous interest rates of the present invention.

FIG. 3 is a flow chart of the process for appropriating the insurance money of the investment-type whole life insurance at autonomous interest rates of the present invention. The process of FIG. 3 is described with reference to the components in FIG. 1.

First, the accident identification and fund appropriation module 411 determines whether an accident happens to the insurant before the whole life insurance payment period expires (Step S301). If an accident happens to the insurant before the whole life insurance payment period expires, the accident identification and fund appropriation module 411 appropriates the insurance proceeds of the policy condition and the balance corresponding to the investment sub-account (when the proposer wins the bid) or the savings sub-account (when the proposer does not win the bid) of the proposer to the beneficiary (Step S302). Afterwards, the accident identification and fund appropriation module 411 terminates the investment-type whole life insurance contract at autonomous interest rates of the proposer (Step S303).

If no accident happens to the insurant before the whole life insurance payment period expires, the accident identification and fund appropriation module 411 determines whether an accident happens to the insurant after the whole life insurance payment period expires (Step S304).

If an accident happens to the insurant after the whole life insurance payment period expires, the accident identification and fund appropriation module 411 appropriates the insurance proceeds of the policy condition and the balance corresponding to the investment sub-account or the savings sub-account of the proposer to the beneficiary (Step S305). Afterwards, the accident identification and fund appropriation module 411 terminates the investment-type whole life insurance contract at autonomous interest rates of the proposer (Step S306).

If no accident happens to the insurant after the whole life insurance payment period expires, the accident identification and fund appropriation module 411 determines whether the proposer applies for the balance corresponding to the investment sub-account or the savings sub-account of the proposer through the user terminal 401 (Step S307). If the proposer does not apply for the balance corresponding to the investment sub-account or the savings sub-account of the proposer, the flow proceeds to Step S304.

If the proposer applies for the balance corresponding to the investment sub-account or the savings sub-account of the proposer, the accident identification and fund appropriation module 411 appropriates the balance corresponding to the investment sub-account or the savings sub-account of the proposer to the proposer (Step S308). The insurance platform 402 keeps the investment-type whole life insurance contract at autonomous interest rates of the proposer valid (Step S309). When an accident happens to the insurant, the accident identification and fund appropriation module 411 appropriates the insurance proceeds of the policy condition to the beneficiary (Step S310). Afterwards, the accident identification and fund appropriation module 411 terminates the investment-type whole life insurance contract at autonomous interest rates of the proposer (Step S311).

The accident identification and fund appropriation module 411 determines whether the insurant is dead, totally disabled, or accords with a cause of an insurance amount payment, so as to appropriate the insurance proceeds and the balance corresponding to the investment sub-account or the savings sub-account of the proposer to the beneficiary.

If the accident identification and fund appropriation module 411 determines that still no accident happens to the insurant after the whole life insurance payment period expires, the proposer may select to apply for all or a part of the balance corresponding to the investment sub-account or the savings sub-account of the proposer to the accident identification and fund appropriation module 411.

An example is given below to illustrate the detailed implementation of the present invention with reference to FIGS. 1-3.

Jack Chou (hereinafter referred to as Jack), 40 years old now, is a director of an electronics company. Kate Chou (hereinafter referred to as Kate), his wife, is a housewife who does housework and takes care of their three-year old son, Aaron Chou (hereinafter referred to as Aaron). Since Jack is diligent in work and appreciated by the boss, his income can not only cover the basic expenses of his family, but also give material comforts to his family.

Although currently his income is stable and good, with the growth of Aaron, Jack, as the only one who makes money in the family, cannot help worrying that the family economy will be greatly influenced if he has a health problem. In addition, due to the increasingly fierce competition of the electronics industry in recent years, Jack is not sure whether his existing income and earnings from stock bonus can be sustained. In this situation, Jack and Kate feel that the existing financing mode mainly relying on the time deposit and company's stock bonus must be adjusted; otherwise, their demands for maintaining the current level of living and guaranteeing retirement life are difficult to be met.

Jack and Kate asked several friends working as finance specialists to plan for them, but these friends mostly recommended them to purchase general whole life insurance policies. After carefully analyzing clauses of such whole life insurance policies, Jack and Kate found that the existing whole life insurance policies mostly have the following disadvantages. (1) The premium paid in previous sessions is mostly used for paying additional charges of the insurance company (i.e., operation and management expenses of the insurance company and commission of business personnel) without interest feedback to the proposer. (2) The appreciation interest rate of the savings (the policy cash value) is low, such that the insured cannot obtain a high income rate. (3) The declared interest rate of the policy lacks flexibility, and when the interest rate goes down, a negative spread may easily occur to the insurance company, which damages the benefits of the insured. (3) The death benefit amount is difficult to exert an effect unless the survival period of the insurant is long enough. (4) The policies mostly do not clearly specify that the beneficiary can only select to receive one of the accumulated premium, the policy cash value, and the amount of benefit when an accident happens to the insurant, which misleads the proposer. (5) The appreciation interest rate (i.e., the declared interest rate) of the savings is decided by the insurance company, and the proposer is passive, which lacks the investment function. (6) The proposer must rely on the policy loan mechanism to meet temporary fund demands, which is difficult to produce actual benefits due to the extra payment of other costs.

Just when Jack and Kate hesitated whether to cover a whole life insurance, they talked about their situation with Smart Xiao, their classmate also working as a senior engineer in an electronics company in an alumni party. Smart Xiao recommended them, by taking himself as an example, to participate in an "insurance platform for investment-type whole life insurance at autonomous interest rates" constructed by an insurance institution according to the present invention, such that they can not only obtain the required guarantee in a more fair and reasonable way but also make retirement financing plans more flexibly.

Jack applies to join the insurance platform 402 for investment-type whole life insurance at autonomous interest rates through the user terminal 401, and enters his basic information into the online policy processing and issuing module 405 of the insurance platform 402 through the user terminal 401 online (Step S201). The online policy processing and issuing module 405 audits the basic information of Jack, and analyzes a proposed condition of an investment-type whole life insurance at autonomous interest rates, and provides an insurance scale combination of the investment-type whole life insurance at autonomous interest rates for Jack to select according to the basic information (Step S203).

When Jack accepts the proposed condition and completes selecting the insurance scale combination, the online policy processing and issuing module 405 approves the whole life insurance applied by Jack, and collects a premium from Jack and issues a policy to Jack (Step S205). When issuing the policy, the online policy processing and issuing module 405 gives Jack an account and a password. Jack may enter the password and account through the user terminal 401 to log in to the insurance platform 402 to participate in a competitive bidding.

After the online policy processing and issuing module 405 completes the underwriting and premium collection, the insurance platform 402 issues an investment-type whole life insurance contract at autonomous interest rates to Jack as follows.

---

Investment-type Whole Life Insurance Policy at Autonomous Interest Rates

Basic Policy Conditions

Proposer: Jack Chou
Insurant: Jack Chou
Beneficiary: Aaron Chou
Insurance Period: for life
Payment period: 20 years
Insurance amount: NT$6,000,000
Premium: calculated based on the anticipated survival years of the insurant from the date on which the policy comes into effect and the premium rate of each session in the survival years.
Premium collection: a level premium is collected per month, and it is assumed that the premium per month is NT$12,500 in the survival period.
Insurance payment:

(1) An accident happens in the payment period: pay all or a part (according to the accident type) of the insurance amount of the beneficiary and accumulated savings of the deposit and borrowing platform at autonomous interest rates (the bid is not won) or the investment account balance of the successful bidding amount that is put into investment (the bid is won).
(2) An accident happens after the payment period expires: pay all or a part (according to the accident type) of the insurance amount of the beneficiary and the investment account balance that is put into investment when the period expires.
Regulations on the deposit and borrowing insurance platform at autonomous interest rates:

(1) The proposer of this policy can use the insurance platform of the insurance company.
(2) The participating conditions are as follows.
(a) Period: a total of 240 sessions for 20 years (1 session/month)
(b) Contribution amount: NT$25,000
(c) Bottom price: adjusted based on the supply and demand of funds by the insurance company flexibly

---

After signing the contract, Jack not only pays a level premium of NT$12,500 per month, but also obtains an opportunity for savings or raising funds to expand investment since he joins the insurance platform 402. It is assumed that Jack performs savings in the first two years of the policy, at this time, the bottom price level of the insurance platform 402 is NT$1,500. Then, Jack needs to pay the insurance platform 402 altogether 25,000+12,500−1,500 =NT$36,000 according to the clearing of the deposit and borrowing competitive bidding module 409 at autonomous interest rates (Step S211), and all the deposit amount is deposited in a savings sub-account of Jack (Step S213).

It is assumed that Jack enters the account and password through the user terminal 401 to log in to the insurance platform 402 so as to compete for a bid at the beginning of the third year (i.e., in the $25^{th}$ session) (Step S207). Jack enters a bidding amount of NT$2,000. The deposit and borrowing competitive bidding module 409 at autonomous interest rates calculates an average deposit interest rate and a borrowing interest rate of all bidding proposers based on the description of Step 3 of the deposit and borrowing method at autonomous interest rates according to the bidding amount entered by Jack. In Steps 1-4 of the deposit and borrowing method at autonomous interest rates, the deposit and borrowing competitive bidding module 409 at autonomous interest rates determines that Jack wins the bid with the bidding amount of NT$2,000 according to a fund balance thereof and the borrowing interest rates of the bidding proposers (Step S209).

The deposit and borrowing competitive bidding module 409 at autonomous interest rates clears a total successful bidding amount of 23,000*215+25,000*24=NT$5,545,000 as an investment amount that Jack can obtain (Step S211). The deposit and borrowing competitive bidding module 409 at autonomous interest rates settles and deposits an amount of NT$5,545,000 in an investment sub-account of Jack (Step S213).

The total successful bidding amount in the investment sub-account of Jack will be managed by the investment management operation module 410, for example, will be put into investment by an investment manager following the prudent principle, so as to obtain a higher investment return for Jack. The investment management operation module 410 publishes an investment objective, an investment profit and loss, and a net asset value of the investment of the funds of Jack's investment sub-account to Jack through the user terminal 401 (Step S215). Jack has to repay a contribution amount of NT$25,000 in each of sessions after he wins the bid.

For example, in the second year after he wins the bid (i.e., in the $49^{th}$ session), Jack unfortunately dies of myocardial infarction due to overwork. Aaron (or his legal representative) may file a claim to the insurance company. The accident identification and fund appropriation module 411 acknowledges the claim (Step S301), and the investment management operation module 410 immediately calculates a balance of the investment. If the investment performance in each of the two years is 10%, the investment account balance is NT$6,709,450 (5,545,000*(1+0.1)^2). At this time, Aaron (or his legal representative) can receive insurance proceeds of NT$7,959,450, a sum of insurance proceeds of NT$6,000,000 plus a balance (NT$1,959,450) after a contribution amount (NT$4,750,000) to be paid in the future sessions is deducted from the balance of the investment sub-account (Step S302). Afterwards, the accident identification and fund appropriation module 411 terminates the investment-type whole life insurance contract at autonomous interest rates of Jack (Step S303).

In another example, it is assumed that Jack does not win the bid or have any accident in the payment period of 20 yeas (Step S304). Jack can receive a total contribution amount of NT$6,000,000 and decides whether to put it into investment in full amount when the period expires in the 20$^{th}$ year. At this time, if Jack decides to withdraw NT$3,000,000 to cover his own living expenses after retirement (Step S307), Jack may apply for the NT$3,000,000 in the investment sub-account to the accident identification and fund appropriation module 411 (Step S308), and the remaining NT$3,000,000 in his investment sub-account continues to be put into investment. At this time, the investment-type whole life insurance contract at autonomous interest rates of Jack is still valid.

If Jack dies in the 25$^{th}$ year (Step S310), at which time the balance of his investment sub-account is NT$3,500,000, the accident identification and fund appropriation module 411 appropriates insurance proceeds (a sum of NT$9,500,000) including a death insurance money of NT$6,000,000 and the NT$3,500,000 in the investment sub-account that Aaron can receive to Aaron (Step S310). Afterwards, the accident identification and fund appropriation module 411 terminates the investment-type whole life insurance contract at autonomous interest rates of Jack (Step S311). Therefore, the investment-type whole life insurance at autonomous interest rates constructed in the present invention can bring the insured a better interest than the conventional whole life insurance.

What is claimed is:

1. Is allowed because the best prior art of record alone or in combination, neither discloses nor fairly suggests the limitations: A method of operating an insurance computing system to set up an investment-type whole life insurance contract at autonomous interest rates, the method comprising:
inputting an application, by a proposer, to the insurance computing system for an investment-type whole life insurance at autonomous interest rates;
generating an instruction, for collecting basic information through a user terminal, by an online policy processing and issuing processor of the insurance computing system;
auditing the basic information by the online policy processing and issuing processor;
analyzing a policy condition of the investment-type whole life insurance at autonomous interest rates;
providing an insurance scale combination of the investment-type whole life insurance at autonomous interest rates according to the basic information;
inputting a selection of the insurance scale combination;
determining an approval of the application by the online policy processing and issuing processor;
collecting a premium and issuing a policy by the insurance computing system;
logging in to the insurance computing system and participating in a competitive bidding process performed by the insurance computing system;
entering a bidding amount into the insurance computing system;
calculating an average deposit interest rate and a borrowing interest rate according to the entered bidding amount by a deposit and borrowing competitive bidding processor;
determining a successful bidding amount and successful bidders according to a fund balance;
clearing a total successful bidding amount of the successful bidders by the deposit and borrowing competitive bidding processor;
clearing a deposit amount of an unsuccessful bidder according to an average borrowing interest rate and a deposit bid bond of the successful bidders, a highest bidding amount of the unsuccessful bidder, or a benchmark interest rate;
settling and depositing the total successful bidding amount in an investment sub-account of the successful bidders by the deposit and borrowing competitive bidding processor;
settling and depositing the deposit amount in a savings sub-account of the unsuccessful bidder; and
determining, by an accident identification and fund appropriation processor, whether an accident occurs before or after a whole life insurance payment period expires, so as to appropriate insurance proceeds and a balance of the investment sub-account or the savings sub-account to a beneficiary or appropriate the balance of the investment sub-account or the savings sub-account to the proposer.

2. The method according to claim 1, inputting the basic information through the user terminal wherein the basic information comprises of a physical status, health information, medical record information, life and work attributes, employment statuses, income levels, financial statuses, and information for determining an underwriting condition, a risk preference degree; and
storing the basic information in a database by the online policy processing and issuing processor.

3. The method according to claim 1, analyzing, by the online policy processing and issuing processor, the policy to generate a total payment amount, insurance proceeds, a policy type, and conditions and contents of the policy, the step of providing the insurance scale combination of the investment-type whole life insurance at autonomous interest rates by the online policy processing and issuing processor comprises analyzing a total payment amount of the policy according to an employment status and a financial status in the basic information of the proposer and generating at least one insurance scale combination for the proposer to select, the insurance scale combination comprises a payment period, a number of competitive bidding sessions, a competitive bidding contribution amount, and the premium to be paid in each of the sessions, and the online policy processing and issuing processor stores the policy condition and the insurance scale combination in a database of the insurance platform.

4. The method according to claim 1, wherein issuing, by the online policy processing and issuing processor, the policy as well as an account and a password; and
storing, by the online policy processing and issuing processor, the policy as well as the account and the password in a database.

5. The method according to claim 1, wherein
calculating, by the deposit and borrowing competitive bidding processor, an amount that all unsuccessful bidders should deposit at a bid opening time point minus a total successful bidding amount of all successful bidding proposers at this time point, and stores the total successful bidding amount in a database of the insurance platform;
determining, by the deposit and borrowing competitive bidding processor, whether the fund balance at a previous bid opening time point plus the fund balance at this bid opening time point is smaller than or equal to zero, and stores the calculated fund balance in the database;

calculating, by the deposit and borrowing competitive bidding processor, the borrowing interest rates according to the bidding amount of the bidders and a bid bond of the selected insurance scale combination read out from the database, sorts the borrowing interest rates of all the bidders, and stores the borrowing interest rates in the database; and determining, by the deposit and borrowing competitive bidding processor, the successful bidding amount and the number of the successful bidders according to the fund balance and the borrowing interest rates of the bidding proposers read out from the database, and stores the successful bidding amount and the number of the successful bidders in the database.

6. The method according to claim 1, wherein the investment-type whole life insurance contract at autonomous interest rates refers to that the proposer can log in to the insurance platform through a user terminal and select to participate in the competitive bidding in a payment period after the proposer covers the insurance.

7. The method according to claim 1, wherein a policy payment period is the same as a competitive bidding period of the insurance computing system, and the participation in the competitive bidding of the insurance computing system is allowed in case the premium is paid in each session.

8. The method according to claim 1, wherein before winning the bid, the deposit amount is deposited in the savings sub-account and an interest is calculated; after winning the bid, all funds are deposited in the investment sub-account and an investment management is performed until the policy payment period expires; and if the proposer does not win the bid or participate in the competitive bidding when the policy payment period expires, all the deposit amount is deposited in the savings sub-account upon the expiration of the policy payment period.

9. The method according to claim 1, wherein the accident identification and fund appropriation processor determines whether an accident occurs to the insurant before the whole life insurance payment period expires;

if an accident occurs to the insurant before the whole life insurance payment period expires, the accident identification and fund appropriation processor appropriates the insurance proceeds and the balance corresponding to the investment sub-account or the savings sub-account of the proposer to the beneficiary;

the accident identification and fund appropriation processor terminates the investment-type whole life insurance contract at autonomous interest rates of the proposer;

if no accident occurs to the insurant before the whole life insurance payment period expires, the accident identification and fund appropriation processor determines whether an accident occurs to the insurant after the whole life insurance payment period expires;

if an accident occurs to the insurant after the whole life insurance payment period expires, the accident identification and fund appropriation processor appropriates the insurance proceeds and the balance corresponding to the investment sub-account or the savings sub-account of the proposer to the beneficiary;

the accident identification and fund appropriation processor terminates the investment-type whole life insurance contract at autonomous interest rates of the proposer;

if no accident occurs to the insurant after the whole life insurance payment period expires, the accident identification and fund appropriation processor determines whether the proposer applies for the balance corresponding to the investment sub-account or the savings sub-account of the proposer through a user terminal;

if the proposer applies for the balance corresponding to the investment sub-account or the savings sub-account of the proposer, the accident identification and fund appropriation processor appropriates the balance corresponding to the investment sub-account or the savings sub-account of the proposer to the proposer;

the investment-type whole life insurance contract at autonomous interest rates is kept valid;

when an accident occurs to the insurant, the accident identification and fund appropriation processor appropriates the insurance proceeds to the beneficiary; and the accident identification and fund appropriation processor terminates the investment-type whole life insurance contract at autonomous interest rates of the proposer.

10. The method according to claim 9, wherein the accident identification and fund appropriation processor identifies that the insurant is dead, totally disabled, or accords with a cause of an insurance amount payment, so as to appropriate the insurance proceeds and the balance corresponding to the investment sub-account or the savings sub-account of the proposer to the beneficiary.

11. The method according to claim 9, wherein if the accident identification and fund appropriation processor determines that still no accident occurs to the insurant after the whole life insurance payment period expires, the proposer may select to apply for all or a part of the balance corresponding to the investment sub-account or the savings sub-account of the proposer to the accident identification and fund appropriation processor.

12. The method according to claim 1, further comprising:

investing and managing the funds of the investment sub-account, and an investment management operation processor of the insurance platform publishing an investment objective, an investment profit and loss, and a net asset value corresponding to an investment of the investment sub-account through the user terminal, and storing the information in the database.

13. An insurance computing system for investment-type whole life insurance at autonomous interest rates, to which a proposer is connected through a user terminal, the insurance platform comprising:

an online policy processing and issuing processor, for accepting an application of the proposer for an investment-type whole life insurance at autonomous interest rates, receiving and auditing basic information filled by the proposer through the user terminal, analyzing a policy condition of the investment-type whole life insurance at autonomous interest rates and providing an insurance scale combination of the investment-type whole life insurance at autonomous interest rates for the proposer to select according to the basic information of the proposer, and collecting a premium from the proposer and issuing a policy to the proposer when approving the investment-type whole life insurance at autonomous interest rates applied by the proposer;

a deposit and borrowing competitive bidding processor at autonomous interest rates, for the proposer to enter a bidding amount through the user terminal to calculate an average deposit interest rate and a borrowing interest rate, determining a successful bidding amount and a number of successful bidders according to a fund balance of the deposit and borrowing competitive bidding processor at autonomous interest rates and the borrowing interest rates, clearing a total successful bidding amount according to the successful bidding amount, clearing a deposit amount according to the average borrowing interest rate and a deposit bid bond, a highest bidding amount, or a benchmark interest rate, settling and depositing the total successful bidding amount in an investment sub-account, and settling and depositing the deposit amount in a savings sub-account; and an accident identification and fund appropriation processor, for determining whether an accident occurs to an insurant before or after a whole life insurance payment period expires, so as to appropriate insurance proceeds and a balance of the investment sub-account or the savings sub-account to a beneficiary or appropriate the balance of the investment sub-account or the savings sub-account to the proposer.

14. The insurance computing system according to claim 13, further comprising:

a database, for the online policy processing and issuing processor to access the basic information of the proposer, the policy condition, the insurance scale combination, and other information, for the deposit and borrowing competitive bidding processor at autonomous interest rates to access the bidding amount, the average deposit interest rate, the borrowing interest rate, the fund balance, the successful bidding amount and the number of the successful bidders, the deposit bid bond, the highest bidding amount, the deposit amount, the total successful bidding amount, the investment sub-account, the savings sub-account, and other information, and for the accident identification and fund appropriation processor to access the accident identification, the fund appropriation, and other information.

15. The insurance computing system according to claim 13, further comprising:

an investment management operation processor, for publishing, through the user terminal, an investment objective, an investment profit and loss, and a net asset value of an investment of the invested and managed funds of the investment sub-account, and storing the information in the database.

16. The insurance computing system according to claim 13, wherein the basic information filled by the proposer through the user terminal is a physical status, health, medical record information, life and work attributes of an insurant, employment statuses, income levels, financial statuses of the proposer and the insurant, and relevant information for determining an underwriting condition of the proposer and a risk preference degree of the insurant, and the online policy processing and issuing processor stores the information in the database.

17. The insurance computing system according to claim 13, wherein the online policy processing and issuing processor analyzes the policy condition to generate a total payment amount, the insurance proceeds, a policy type, and other conditions and contents of the insurance contract covered by the proposer, the step of providing the insurance scale combination of the investment-type whole life insurance at autonomous interest rates by the online policy processing and issuing processor comprises analyzing a total payment amount of the policy according to an employment status and a financial status in the basic information of the proposer and generating at least one insurance scale combination for the proposer to select, the insurance scale combination comprises a payment period, a number of competitive bidding sessions, a competitive bidding contribution amount, and the premium to be paid in each of the sessions, and the online policy processing and issuing processor stores the policy condition and the insurance scale combination in the database.

18. The insurance computing system according to claim 13, wherein the online policy processing and issuing processor issues the policy as well as an account and a password to the proposer, the proposer enters the account and the password through the user terminal to log in to the insurance platform so as to participate in a competitive bidding, and the online policy processing and issuing processor stores the policy as well as the account and the password in the database.

19. The insurance computing system according to claim 13, wherein the deposit and borrowing competitive bidding processor at autonomous interest rates performs the following steps:

calculating an amount that all unsuccessful bidding proposers should deposit at a bid opening time point minus a total successful bidding amount of all successful bidding proposers at this time point, and storing the total successful bidding amount in the database;

determining whether the fund balance at a previous bid opening time point plus the fund balance at this bid opening time point is smaller than or equal to zero, and storing the calculated fund balance in the database;

calculating the borrowing interest rates according to the bidding amount of the bidding proposer and a bid bond of the selected insurance scale combination read out from the database, sorting the borrowing interest rates of all the bidding proposers, and storing the borrowing interest rates in the database; and determining the successful bidding amount and the number of the successful bidders according to the fund balance and the borrowing interest rates of the bidding proposers read out from the database, and storing the successful bidding amount and the number of the successful bidders in the database.

20. The insurance computing system according to claim 13, wherein the accident identification and fund appropriation processor performs the following steps:

determining whether an accident occurs to the insurant before the whole life insurance payment period expires;

if an accident occurs to the insurant before the whole life insurance payment period expires, appropriating the insurance proceeds and the balance corresponding to the investment sub-account or the savings sub-account of the proposer to the beneficiary;

terminating the investment-type whole life insurance contract at autonomous interest rates of the proposer;

if no accident occurs to the insurant before the whole life insurance payment period expires, determining whether an accident occurs to the insurant after the whole life insurance payment period expires;

if an accident occurs to the insurant after the whole life insurance payment period expires, appropriating the insurance proceeds and the balance corresponding to the investment sub-account or the savings sub-account of the proposer to the beneficiary;

terminating the investment-type whole life insurance contract at autonomous interest rates of the proposer;

if no accident occurs to the insurant after the whole life insurance payment period expires, determining whether the proposer applies for the balance corresponding to the investment sub-account or the savings sub-account of the proposer through the user terminal;

if the proposer applies for the balance corresponding to the investment sub-account or the savings sub-account of the proposer, appropriating the balance corresponding to the investment sub-account or the savings sub-account of the proposer to the proposer;

keeping the investment-type whole life insurance contract at autonomous interest rates valid;

when an accident occurs to the insurant, appropriating the insurance proceeds to the beneficiary; and terminating the investment-type whole life insurance contract at autonomous interest rates of the proposer.

21. The insurance computing system according to claim 20, wherein the accident identification and fund appropriation processor identifies that the insurant is dead, totally disabled, or accords with a cause of an insurance amount payment, so as to appropriate the insurance proceeds and the balance corresponding to the investment sub-account or the savings sub-account of the proposer to the beneficiary.

22. The insurance computing system according to claim 20, wherein if the accident identification and fund appropriation processor determines that still no accident occurs to the insurant after the whole life insurance payment period expires, the proposer may select to apply for all or a part of the balance corresponding to the investment sub-account or the savings sub-account of the proposer to the accident identification and fund appropriation processor.

* * * * *